July 15, 1969     T. G. HESSELGREN     3,456,165
ALTERNATING CURRENT BRIDGE CIRCUIT
Filed Feb. 20, 1967

INVENTOR
Tore Gottfrid Hesselgren

BY Strauch, Nolan, Neale, Nies & Kurz

ATTORNEYS

United States Patent Office 3,456,165
Patented July 15, 1969

3,456,165
ALTERNATING CURRENT BRIDGE CIRCUIT
Tore Gottfrid Hesselgren, Barensvägen 1, Johanneshov,
Stockholm, Sweden
Filed Feb. 20, 1967, Ser. No. 617,259
Claims priority, application Sweden, Feb. 22, 1966,
2,298/66
Int. Cl. H01h 47/36, 47/32
U.S. Cl. 317—153                                    5 Claims

ABSTRACT OF THE DISCLOSURE

The bridge circuit comprises rectifiers for producing between two diagonally opposite points an output voltage which is a pulsating direct voltage composed of two interleaved half-waves of the same polarity. When the bridge circuit is balanced the amplitudes or peak values of the two half-waves are substantially equal. In unbalanced condition of the bridge circuit one of the half-waves is reduced in amplitude or wholly suppressed. The output voltage is applied to a relay device which is maintained in operated condition as long as the bridge circuit is balanced but is released when unbalance occurs. The relay device is provided with contacts for actuating signalling, alarm, indicating or recording means.

Background of the invention

The invention relates to an alternating current bridge circuit which is primarily intended for use in electric alarm and signalling systems such as fire or burglary alarm systems and systems for the supervision of machinery and industrial processes.

Bridge circuits for the said purposes are known in which an output voltage is produced if the balance of the bridge circuit is upset, whereas no output voltage is produced when the bridge circuit is in its normal balanced state. Bridge circuits of this type suffer from the disadvantage that a fault in the power supply system for the bridge circuit will have the same effect as the normal function of the circuit, that is no output voltage is produced, so that the signalling or alarm system is made inoperative without this fact being immediately noticed.

Summary of the invention

The alternating current bridge circuit comprises normally energized switching means which is released when the bridge balance is changed. The bridge circuit has a first, a second, a third and a fourth junction point. The second and third points are interconnected by impedance means. Alternating voltage is supplied to the bridge circuit in such manner that alternating voltages appear in the second and third points in relation to the first point, the alternating voltage of the second point being out of phase with the alternating voltage of the third point, and the two voltages having substantially equal amplitudes when the bridge is in its normal balanced state. Half-wave rectifiers are provided to rectify the said voltages in the same sense in relation to the fourth point, so that a pulsating direct voltage is produced between the fourth point and the first point. Said switching means comprises a relay device with a self-holding circuit. The release time of the relay device is less than one half-cycle of the alternating voltage supplied to the bridge circuit. The pulsating direct voltage between said fourth and first points is applied to control the relay device.

If the bridge circuit is used for instance in a burglary alarm system one or two of the bridge branches are extended over places that are to be protected against unauthorized entry or access so that such access or entry is not possible without tampering with the bridge branches. Any tampering with a bridge branch will cause a change in its impedance thereby upsetting the balance of the bridge in which case the switching means is released thereby initiating the alarm system. Since the balance of the bridge circuit is upset both when the impedance of a bridge branch is increased and when it is reduced, the initiation of an alarm cannot be prevented either by cutting off the bridge branch or by short-circuiting or bypassing part of it. Also, if the power supply for the bridge circuit is disconnected, an alarm will be initiated because the switching means is normally energized and will be effective to initiate the alarm when deenergized.

Description of the preferred embodiment

Figure 1:
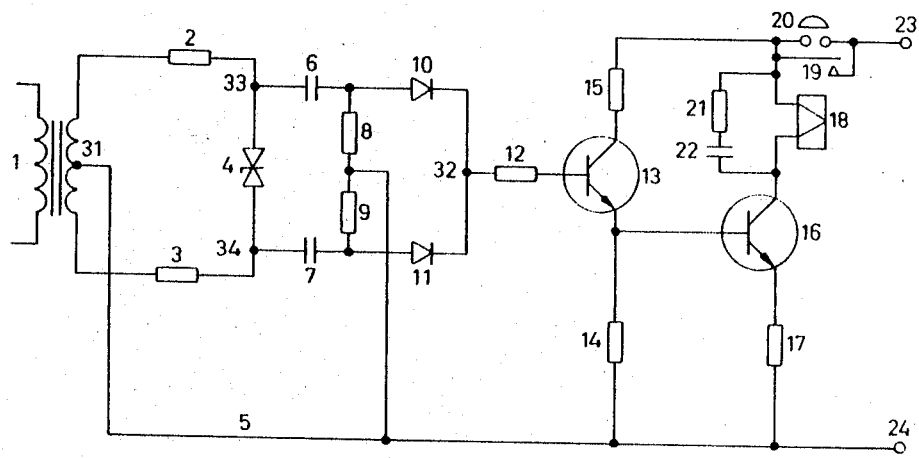
FIGURE 1 is a circuit diagram of a preferred embodiment of the invention.

Referring to FIGURE 1, the bridge circuit comprises four branches, which are joined in pairs at points 31, 32, 33 and 34. In the following description the different bridge branches will be identified by stating the points between which they are connected. The bridge branch located between the points 31 and 33 will thus be called the bridge branch 31–33 and the other bridge branches in an analogous way.

The point 31 is formed by a tap on the secondary winding of a transformer 1, the primary winding of which is connected to a suitable alternating voltage source for feeding the bridge circuit. In the following the point 31 will be regarded as the reference point for the voltages occurring in the bridge circuit.

The bridge branches 31–33 and 31–34 each comprise part of the secondary winding of the transformer 1 and an impedance 2 and 3 respectively. If the bridge circuit is to be used as an alarm device, the impedances 2 and 3 or at least one of them is in the form of a line loop comprising a plurality of impedance elements which are preferably resistors connected in series and located at places that are to be protected against unauthorized entry or access. If both impedances 2 and 3 are in the form of such line loops, they should be so disposed that they are not both accessible from the same place.

Each of the bridge branches 33–32 and 34–32 comprises a rectifier 10 and 11 respectively, in series with a capacitor 6 and 7 respectively. The rectifiers 10 and 11 are both oriented with the forward direction towards the point 32. A resistor 8 is connected to the junction of capacitor 6 and rectifier 10, the other terminal of the resistor being connected to the reference point 31 over line 5. The resistor 8 is a discharging resistor for the capacitor 6. In an analogous way a discharging resistor 9 is provided for the capacitor 7.

Between the points 33 and 34 an impedance 4 is connected which impedance thus forms a diagonal branch in the bridge. This impedance 4 may be a resistance of a nonlinear type, for example a so called varistor, and in FIG. 1 it is marked with the symbol for a resistance of this type. The purpose of this will be described in the following.

The points 31 and 32 are connected to the input of an amplifier which in FIG. 1 is indicated as a transistor amplifier comprising the transistors 13 and 16 and the resistors 12, 14, 15 and 17. To the output of the amplifier the winding of a relay 18 is connected forming the normally energized switching device. The relay 18 is provided with a self-holding contact 19. The transistor amplifier is supplied with the required direct-current voltage from the terminals 23 and 24, the current feed circuit for the last stage of the amplifier including in series the contact 19 and the winding of the relay 18. A series circuit consisting of a resistor 21 and a capacitor 22 is connected in parallel with the winding of relay 18. This circuit is intended to protect transistor 16 against the high voltage induced in the relay winding 18, when the current therethrough is interrupted. In order to make it possible for the relay to be energized again after a release a manually operable switch 20 is connected in parallel with the holding contact 19.

The relay 18 is also provided with one or more contacts (not shown in the figure), which are connected in control circuits for signalling and/or recording devices of a known kind.

The mode of operation of the bridge circuit will now be described. The voltages mentioned in the following description are voltages of various points in relation to the reference point 31 unless otherwise stated.

The impedances 2 and 3 and the parts of the secondary winding of transformer 1 located on either side of the reference point 31, are dimensioned and arranged in such a way, that in the normal state of the bridge circuit, the voltages at points 33 and 34 have substantially the same amplitude but the opposite phase. The easiest way of obtaining this is to make the impedances 2 and 3 equal and to make the reference point 31 the center tap on the secondary winding of the transformer 1.

Figure 2:
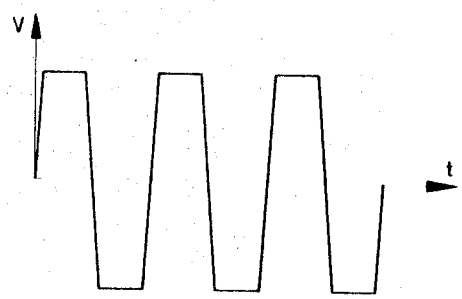
FIGURES 2–4 are graphs showing voltages appearing in the bridge circuit as functions of time.

If the primary winding of the transformer 1 is connected to a voltage source generating a sinusoidal alternating voltage, the voltages in the points 33 and 34 will be deformed owing to the non-linear resistance 4, so that these voltages get a trapezoidal or approximately rectangular wave-form as shown in FIG. 2. If it is presumed that the diagram in FIG. 2 represents the voltage at point 33, the voltage at point 34 is represented by a voltage curve of the same shape and amplitude but out of phase by 180° in relation to the curve in FIG. 2.

Figure 3:
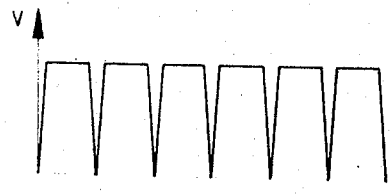

The alternating voltages at points 33 and 34 are rectified by the rectifiers 10 and 11 respectively. Hereby a pulsating direct-current voltage is produced at point 32 as shown in FIG. 3. Every second pulse in this direct-current voltage is thus derived from the point 33 and the others from the point 34. This pulsating direct-current voltage is applied to the input of the transistor amplifier as a control voltage. This amplifier is so designed that the input voltage must exceed a certain value (which may be equal to 0), in order that the relay 18 shall receive a sufficiently strong current to keep it operated. The pulses in the pulsating direct-current voltage according to FIG. 3 has a sufficient top value for keeping the relay 18 operated. The voltage drop between two successive pulses is of too short duration to cause release of relay 18. As long as the voltage at point 32 is as shown in FIG. 3 relay 18 will thus remain operated.

Figure 4:
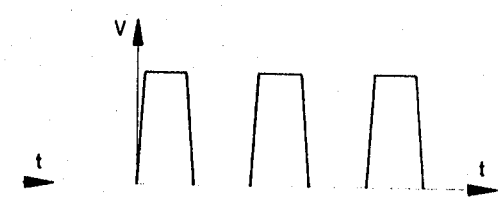

If the bridge balance is changed so that the impedance 2 is changed in relation to the impedance 3, the voltages at points 33 and 34 will no longer have the same amplitude. In the pulsating direct-current voltage appearing at point 32, every second pulse will consequently have a higher top value and the other pulses a lower top value. If the change in the ratio of the impedances 2 and 3 is large enough, every second pulse in the pulsating direct-current voltage at point 32 will be completely suppressed, so that the voltage at point 32 will be as shown in FIG. 4. The change in the ratio of the impedances 2 and 3, required for making this happen, is dependent on the relation between the value of the impedance 4 on one hand and on the normal values of the impedances 2 and 3 on the other hand. The last mentioned relation may be so chosen that only a slight change in the ratio of the impedances 2 and 3 is needed to cause every second pulse in the pulsating direct-current voltage at point 32 to be completely suppressed.

Upon a change in the bridge balance the voltage at point 32 will thus be changed so that it will consist of relatively strong pulses separated by intervals corresponding to a half-cycle of the alternating voltage fed to the bridge circuit, in which intervals very much weaker pulses or no pulses at all appear as shown in FIG. 4. The relay 18 has a release time less than one half-cycle of the alternating voltage fed to the bridge circuit, and when the voltage at point 32 is changed when the bridge balance is upset, as has been described above, the relay will be released during the interval between two strong pulses. As the contact 19 is thereby opened, relay 18 cannot be energized again when the next strong pulse occurs at the input of the transistor amplifier.

When relay 18 is released its other contacts (not shown) are also operated, which is utilized in a known way for operating signalling or recording devices of a known kind.

The bridge circuit shown in the drawing and described above may be modified in many ways within the scope of the invention. Thus, capacitors 6 and 7 are not absolutely necessary. The purpose of these capacitors in the shown embodiment is that when the bridge circuit is used in an alarm system, it shall not be possible to prevent the initiation of an alarm by connecting a direct current source, for example a portable battery, in series with impedance 2 or 3.

The impedances 4 need not necessarily be of the non-linear kind, but it may consist of a linear resistance. In order to make the pulses in the pulsating direct-current voltage in the point 32 assume a rectangular or trapezoidal wave-form, the transformer 1 may be fed with an alternating voltage with a rectangular or a trapezoidal wave-form. The bridge circuit may work satisfactorily, however, even if it is fed with a sinusoidal alternating voltage and this voltage is rectified without deformation, so that under normal working conditions the pulsating direct-current voltage at point 32 assumes the form of a commutated sine wave.

Also, the relay device need not necessarily be an electromagnetic relay as in the described embodiment, but it can be for instance an electronic relay device of a known kind.

I claim:

1. An alternating bridge circuit comprising a first, a second, a third and fourth junction point, and switching means connected to be energized by an output voltage from the bridge circuit when the bridge circuit is in balanced state and to be released when the balance of the bridge circuit is upset, wherein the improvement comprises a diagonal branch including resistance means (4) between said second point (33) and said third point (34), means for producing a first alternating voltage across a bridge branch between said second (33) and said first (31) points and a second alternating voltage across a bridge branch between said third (34) and said first (31) point, said first and second alternating voltages being of opposite phase, impedance means (2 and 3) in the bridge branches between said first and second points and between said first and third points, said impedance means having such normal values that said two alternating voltages have substantially equal amplitudes in the normal balanced state of the bridge circuit, half-wave rectifying means (10 and 11) for rectifying said two voltages in the same sense in relation to said fourth point (32), thereby producing between said fourth point (32) and said first point (31) a pulsating direct voltage, said switching means comprising a relay device (18) with a self-holding circuit (19), said relay device having a release time less than one half-cycle of the alternating voltage applied to the bridge circuit, and means (12–17) for applying the pulsating direct voltage between said fourth (32) and first (31) points to control said relay device.

2. An alternating voltage bridge circuit as claimed in claim 1, wherein said resistance means (4) is a resistor of a nonlinear type.

3. An alternating voltage bridge circuit as claimed in claim 1, wherein said relay device (18) is connected to the output of an amplifier (12–17) the input terminals of which are connected to said first point (31) and said fourth point (32).

4. An alternating voltage bridge circuit as claimed in claim 1, wherein capacitors (6 and 7) are connected in series with said half-wave rectifying means (10 and 11).

5. An alternating voltage bridge circuit comprising a transformer for supplying an alternating voltage to the bridge circuit and a plurality of branches interconnected at four junction points, wherein the improvement comprises a first branch between a first point (31) and a second point (33) including in series part of a secondary winding on said transformer (1) and a first impedance means (2), a second branch between said first point (31) and a third point (34) including in series another part of said secondary winding and a second impedance means (3), a third branch between said second point (33) and a fourth point (32) including a first half-wave rectifying means (10), a fourth branch between said third point (34) and said fourth point (32) including a second half-wave rectifying means (11), a fifth branch between said second point (33) and said third point (34) including resistance means (4), a sixth branch between said first point (31) and said fourth point (32) including relay means (18) having a release time less than one half-cycle of the alternating voltage supplied to the bridge circuit.

References Cited

UNITED STATES PATENTS

| | | |
|---|---|---|
| 2,728,904 | 12/1955 | Schafer. |
| 2,808,474 | 10/1957 | Maynard et al. |
| 3,335,334 | 8/1967 | Albisser _____ 317—153 |

JOHN F. COUCH, Primary Examiner

J. D. TRAMMELL, Assistant Examiner

U.S. Cl. X.R.

323—75; 324—101